April 27, 1965 R. E. LOOMANS 3,180,291
ADJUSTABLE SHOVEL WINGS
Filed Feb. 10, 1964

INVENTOR.
ROBERT E. LOOMANS
BY
Roger C. Johnson
ATTORNEY

United States Patent Office
3,180,291
Patented Apr. 27, 1965

3,180,291
ADJUSTABLE SHOVEL WINGS
Robert E. Loomans, Horicon, Wis., assignor to Deere & Company, Moline, Ill., a corporation of Delaware
Filed Feb. 10, 1964, Ser. No. 343,804
1 Claim. (Cl. 111—85)

This invention relates generally to agricultural implements and more particularly to planting implements, such as grain drills or the like.

The object and general nature of this invention is the provision of a new and improved grain drill especially adapted for use in dry land territories where, at planting time, a layer of relatively dry soil covers soil containing some moisture. More specifically, it is a feature of this invention to provide a grain drill having furrow openers adapted to penetrate into the moist soil, deposit seed therein, and a plurality of means associated with each furrow opener and simultaneously adjustable to hold back the correct amount of dry soil to prevent excessive quantities of the latter from falling into the furrow on top of the planted seed. More specifically, it is a feature of this invention to provide generally vertically adjustable curved members lying substantially directly in front of the press wheels that are associated with the runners, said curved members being adjustable generally arcuately relative to the press wheels for determining the amount of dry soil prevented from falling back into the furrow onto the planted seed.

These and other objects and advantages of this invention will be apparent to those skilled in the art after a consideration of the following detailed description of the preferred structural embodiment, taken in conjunction with the accompanying drawings in which said preferred embodiment has been illustrated.

Figure 1:
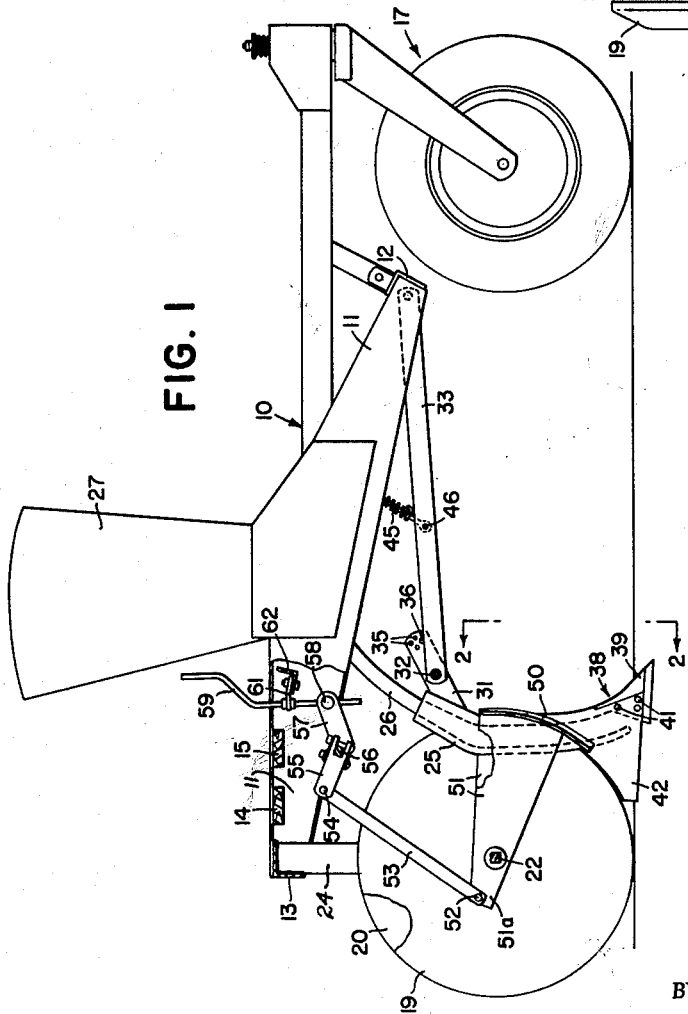
FIG. 1 is a side view of a grain drill, certain parts being broken away, in which the principles of this invention have been incorporated.

Referring first to FIG. 1, the frame of the grain drill is indicated at 10 and comprises a pair of side members 11 interconnected by suitable transverse angles 12 and 13, together with other conventional frame members 14 and 15. The frame is supported at its front portion on a caster wheel hitch unit 17 and at its rear portion on a plurality of pairs of press wheels 19 and 20. The pairs of press wheels 19 and 20 are mounted fixedly on a transverse axle 22, and between each pair of press wheels the axle 22 receives a bearing member 23 to which a vertical standard 24 is connected, each standard 24 is fixed at its upper end in any suitable way to the frame 10 as, for example, by welding to the angle 13.

Figure 2:
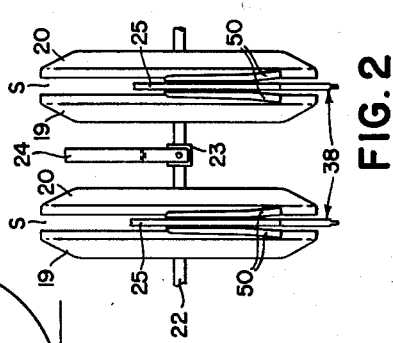
FIG. 2 is a fragmentary rear view, looking rearwardly, of a portion of the grain drill generally along the line 2—2 of FIG. 1.

It will be noted that the press wheels 19 and 20 of each pair are spaced apart, as indicated by the reference character S, as best shown in FIG. 2, this space being sufficient to receive a relatively narrow seed boot 25 that extends in a generally vertical direction behind the forwardmost portions of the associated press wheels, the boot being constructed and arranged at its upper portion to receive a flexible seed tube 26 extending downwardly from a seed hopper 27 carried on the frame. The seed hopper is provided with conventional seed dispensing mechanisms by which seed is delivered at the desired rate into the associated seed tubes 26. Each seed boot 25 is provided with a forward arm 31 that is pivoted, as at 32, to the rear end of an associated drag bar 33.

A forward extension of each arm 31 is provided with a plurality of openings 35 in any one of which a shear pin 36 is adapted to be disposed. The shear pins 36 releasably hold the seed boots 25 against pivoting rearwardly relative to the associated drag bars when the grain drill is in operation. Fixed to the lower end of each seed boot is a furrow opener 38 that is relatively narrow and lies within or directly in front of the space S between the associated pair of press wheels 19 and 20. The furrow opener 38 includes a shovel 39 that is detachably connected with the lower portion of the furrow opener 38, as by bolts 41 or other suitable means. The furrow opener 38 also includes a pair of relatively closely spaced plates 42, which latter parts serve to form a relatively narrow furrow in the soil, the replaceable and removable shovel 39 extending downwardly into the moist soil underneath the relatively dry soil lying at the top of the ground. Suitable means for raising and lowering the furrow openers is carried by the fram 10, such means including, among other things, pressure rods 45 connected to the drag bars 33, as at 46.

It will be seen, particularly from FIG. 2, that the press wheels 19 and 20 are generally of conical configuration and in operation press against the side portions of the furrow opened by the furrow opener 38. According to this invention I provide a pair of wings 50 disposed at each side of the furrow opener and generally directly in front of the associated press wheels 19 and 20 for the purpose of holding back some of the soil disturbed by the forward portion of the furrow opener 38 so as to prevent the upper portions of the dry soil from falling down into the furrow. The wings 50 are adjustable vertically, all wings being adjustable simultaneously, for the purpose of varying the amount of soil that is permitted to fall into the furrow, and such soil portions that do fall into the furrow from the upper part of the ground are pressed against the sides of the furrow by the conical outer surfaces of the press wheels 19 and 20.

The right- and left-hand wings 50 are, as best shown in FIG. 1, curved generally in conformity with the press wheels 19 and 20, each wing being mounted on a plate 51 that is pivotally or swingably mounted on the axis 22, the plates 51 being disposed on opposite sides of the associated seed boot 25. Each of the plates 51 is extended rearwardly, as at 51a, and apertured to receive a pivot pin 52 carried by a connector bar 53 that extends generally upwardly between the press wheels 19 and 20 to a point of pivotal connection, as at 54, with an arm 55 fixed to a transverse rockshaft 56 that is rotatably carried by the frame 10 and extends generally the transverse length of the latter. Fixed to the rockshaft 56, generally adjacent the central portion thereof, is an arm 57 carrying a screw threaded trunnion 58 in which an adjusting crank 59 is connected, the crank 59 being turnable but held against axial displacement by a bracket 61 fixed to a transverse angle 62 carried by the frame 10. As will be clear, turning the crank 59 acts to swing all of the plates 51 and simultaneously adjusts the generally vertical positions of all of the wings 50 relative to the associated furrow openers.

While I have shown and described above the preferred structure in which the principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

In a grain drill having a frame, a plurality of generally vertical furrow openers pivotally connected with said frame for generally vertical swinging movement, a plurality of coaxial press wheels arranged in pairs, transverse axle means on which said press wheels are disposed for rotation, each pair of press wheels being disposed at opposite sides of the associated furrow opener, the forward portions of said press wheels overlapping adjacent portions of said furrow openers, a plurality of pairs of wings, each pair being disposed on opposite sides of the associated furrow opener and lying substantially directly in front of the associated press wheels, said wings being arcuate in shape so as to follow relatively closely the periphery of said press wheels, the combination therewith of means connected with all of said wings for swinging all of said wings generally arcuately about said press wheels so as to raise and lower all of said wings relative to said furrow openers, said means comprising a plurality of pairs of arms journalled on the axle and disposed on opposite sides of said furrow openers and each pair of arms being between the associated pair of press wheels, means fixing each pair of wings to the forward end of the adjacent pair of arms, a shaft rockably supported on said frame, means for rocking said shaft, and a connection from said shaft to said plurality of pairs of arms, whereby rocking of said shaft serves to simultaneously adjust the position of all of said wings.

References Cited by the Examiner
UNITED STATES PATENTS

| | | | |
|---|---|---|---|
| 288,661 | 11/83 | Purdy et al. | 111—86 |
| 350,752 | 10/86 | Laning | 111—86 X |
| 1,114,495 | 10/14 | Lusk | 111—83 X |
| 2,736,279 | 2/56 | Johnston | 111—85 X |
| 2,925,056 | 2/60 | Wade | 111—86 |

ABRAHAM G. STONE, *Primary Examiner.*

WILLIAM A. SMITH III, *Examiner.*